(12) United States Patent
Yoshida

(10) Patent No.: US 7,989,754 B2
(45) Date of Patent: Aug. 2, 2011

(54) OPTICAL CIRCUIT AND METHOD FOR MEASURING MONITOR CHARACTERISTIC

(75) Inventor: Hideshi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 333 days.

(21) Appl. No.: 12/399,387

(22) Filed: Mar. 6, 2009

(65) Prior Publication Data

US 2009/0224144 A1 Sep. 10, 2009

(30) Foreign Application Priority Data

Mar. 7, 2008 (JP) ................................. 2008-057279

(51) Int. Cl.
*H01J 40/14* (2006.01)

(52) U.S. Cl. ........ 250/214 C; 398/202; 383/89; 348/243

(58) Field of Classification Search ............... 250/214 C, 250/214 LA, 214 A, 214 R; 398/202, 208, 398/214; 383/89–93; 348/243–245

See application file for complete search history.

(56) References Cited

U.S. PATENT DOCUMENTS

| 7,256,383 B2 * | 8/2007 | Ozawa ...................... 250/214 C |
| 7,620,330 B2 * | 11/2009 | Faska et al. ............... 250/214 C |
| 2003/0179988 A1 * | 9/2003 | Kai et al. ........................ 385/24 |

FOREIGN PATENT DOCUMENTS

| JP | 1998223963 A | 8/1998 |
| JP | 2002374023 A | 12/2002 |

* cited by examiner

*Primary Examiner* — Seung C Sohn

(57) ABSTRACT

An optical circuit includes a selector that supplies an output current from a first photodetector to a converter provided for a second photodetector, and a processor that imaginarily calculates the level of signal light output from an optical device, which is detected by the second photodetector, based upon the level of signal light input to the optical device, which is measured by measurement means, and upon conversion efficiencies of the first and second photodetectors and that thus calculates the correlation between the output signal light level and its monitored value output from the converter provided for the second photodetector.

21 Claims, 8 Drawing Sheets

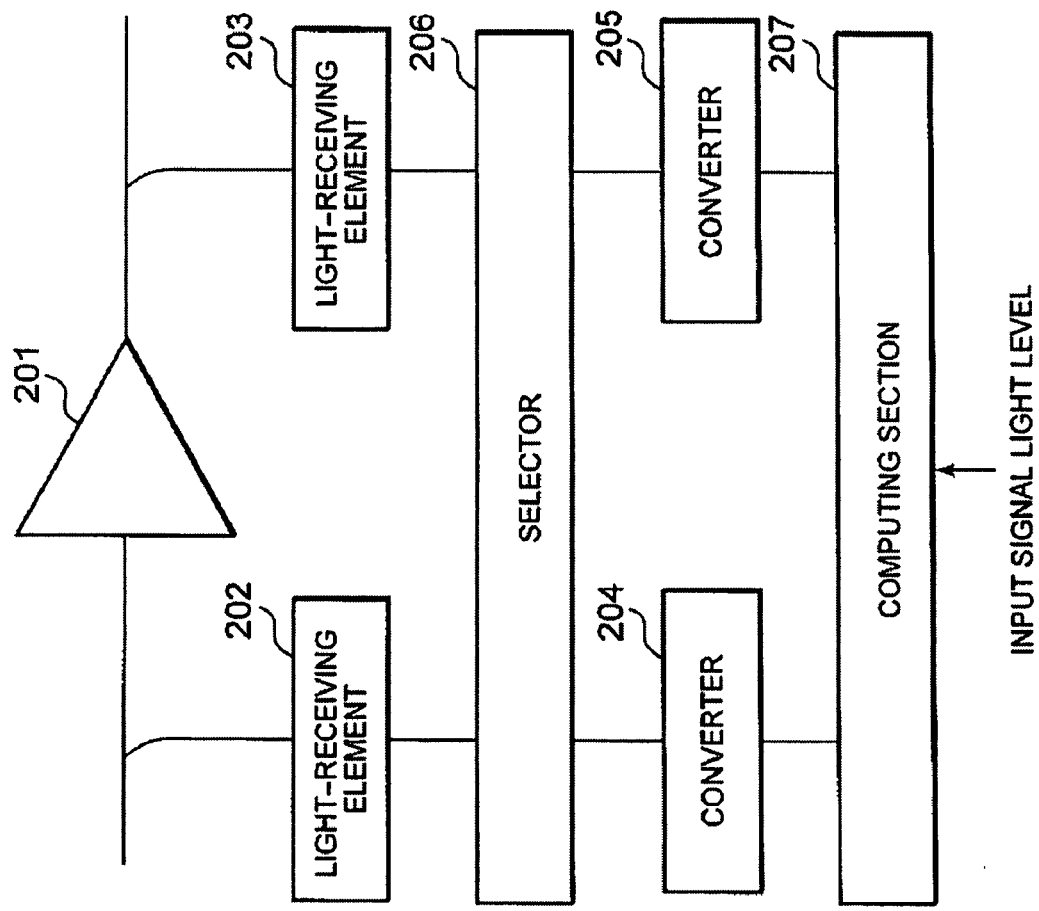



OPTICAL CIRCUIT AND METHOD FOR MEASURING MONITOR CHARACTERISTIC

This application is based upon and claims the benefit of priority from Japanese Patent Application No. 2008-057279, filed on Mar. 7, 2008, the disclosure of which is incorporated herein in its entirety by reference.

BACKGROUND OF THE INVENTION

1. Field of the Invention

The present invention relates to an optical circuit and, more particularly, to an optical circuit including signal light level monitors and a monitor characteristic measurement method.

2. Description of the Related Art

An example of an optical circuit including optical amplifiers is shown in FIG. 1, which is based on a conventional optical amplification device disclosed in, for example, Japanese Patent Application Unexamined Publication No. Hei10-223963 (hereinafter, referred to as JP10-223963) and Japanese Patent Application Unexamined Publication No. 2002-374023A (hereinafter, referred to as JP2002-374023). This optical circuit can be broadly divided into two sections: an optical module section 103 that amplifies an optical signal; and an electronic control section 104 that controls the optical module section 103.

The optical module section 103 includes: an optical connector 51 for input of signal light into the optical module section 103; an optical connector 52 for output of the signal light from the optical module section 103; erbium-doped fibers (EDFs) 53 and 54, which are media for directly optically amplifying the signal light; a gain equalizer 55 for equalizing the signal light power of each channel included in the wavelength-division-multiplexed (WDM) signal light to be output from the optical module section 103; photo diodes (PDs) 56 to 59 for detecting the power of the signal light before and after each of the EDFs 53 and 54; and optical couplers 60 to 63 for branching the signal light into the PDs 56 to 59, respectively.

The electronic control section 104 includes: conversion circuits 64 to 67 for converting the currents output from the PDs 56 to 59 to output numerical data (PD monitored values), respectively; and a processor 68 for calculating the power of the monitored signal light from the PD monitored value (numerical data) inputted from each of the conversion circuits 64 to 67. Note that the processor 68 has a function of controlling the amplification factor for the signal light by adjusting, based on the PD monitored values, pumping light output from a pumping laser diode (LD) (not shown). Since this function is well known to those skilled in the art, a detailed description thereof will be omitted.

It is well known to those skilled in the art that the amount of photocurrent [μA] output from a PD in an optical module to be mounted on such an optical amplification device is measured in a process of manufacturing the optical module, to measure the amount of photocurrent [μA] for 1 mW of signal light power, conversion efficiency [μA/mW], whereby the correlation between the signal light power and the amount of PD output current is calculated.

Moreover, applying this scheme, it is also possible to measure the correlation between the signal light power and its PD monitored value that is numerical data obtained by a conversion circuit (for example, an AD converter or the like) converting the amount of photocurrent. Based on this correlation, a processor (for example, a CPU or the like) can calculate the power of monitored signal light from a corresponding PD monitored value.

According to the circuit structure as shown in FIG. 1, with respect to the PD 56 at its input stage and the PD 59 at its output stage, the signal light power can be directly measured with measurement equipment (not shown) inputting the signal light from the optical connectors 51 and 52, respectively, whereby it is possible to determine a relational expression between the power of each monitored signal light and the PD monitored value output from a corresponding one of the conversion circuits 64 and 67.

However, according to the circuit structure as shown in FIG. 1, for the PDs 57 and 58, a relational expression between monitored signal light power and its PD monitored value cannot be determined because the monitored signal light power cannot be directly measured. If one wishes to directly measure the monitored signal light power, measurement would be performed by cutting the optical waveguide at the input end of the PD (the optical fiber immediately before the PD) and connecting an optical power meter or the like thereto.

According to JP2002-374023, for a combination of the PD (57, 58) and the conversion circuit (65, 66), a number of designated light levels are imaginarily set for calculating PD characteristic values by using a characteristic equation between a level of input light to the PD and an output value of the conversion section. The processor 68 calculates a proportional. constant from the designated light levels and the corresponding PD characteristic values to obtain a linear function. However, such a method for obtaining the linear function puts a heavy processing load on the processor 68.

SUMMARY OF THE INVENTION

An object of the present invention is to provide an optical circuit and a monitor characteristic measurement method that can solve the above problems and can obtain a relational expression between a signal light level and its monitored value for a light monitor which cannot directly measure the signal light, without increasing processing loads.

According to the present invention, an optical circuit includes at least one optical device which inputs one of a first signal light and a second signal light and outputs the other, and further includes: a first photodetector for converting the first signal light to a first detection signal, wherein the first photodetector has a first conversion efficiency; a second photodetector for converting the second signal light to a second detection signal, wherein the second photodetector has a second conversion efficiency; a converter provided for each of the first and second photodetectors, for converting a corresponding detection signal to a monitored signal; and a controller controlling such that the first detection signal is connected to a non-corresponding converter and the second detection signal is connected to the interruption, calculating a first signal value of the first detection signal from the first conversion efficiency and a previously measured level of the first signal light; calculating an imaginary light level of the output signal light from the first signal value calculated and the second conversion efficiency, wherein the imaginary light level of the second signal light is a light level of the second signal light to be input to the second photodetector when the second detection signal exhibits the first signal value calculated; and calculating correlation between the imaginary light level of the second signal light and a monitored signal obtained by the non-corresponding converter inputting the first signal value calculated.

According to the present invention, a method for measuring a monitor characteristic in an optical circuit including at least one optical device which inputs one of a first signal light and a second signal light and outputs the other, wherein the optical circuit further includes: a first photodetector for converting the first signal light to a first detection signal, wherein the first photodetector has a first conversion efficiency; a second photodetector for converting the second signal light to a second detection signal, wherein the second photodetector has a second conversion efficiency; a converter provided for each of the first and second photodetectors, for converting a corresponding detection signal to a monitored signal, the method includes: connecting the first detection signal to a non-corresponding converter and connecting the second detection signal to an interruption; calculating a first signal value of the first detection signal from the first conversion efficiency and a previously measured level of the first signal light; calculating an imaginary light level of the output signal light from the first signal value calculated and the second conversion efficiency, wherein the imaginary light level of the second signal light is a light level of the second signal light to be input to the second photodetector when the second detection signal exhibits the first signal value calculated; and calculating correlation between the imaginary light level of the second signal light and a monitored signal obtained by the non-corresponding converter inputting the first signal value calculated.

The present invention can achieve the effect that a relational expression between a signal light level and its monitored value can be obtained for a light monitor which cannot directly measure the signal light without increasing processing loads.

BRIEF DESCRIPTION OF THE DRAWINGS

FIG. 2B is a schematic functional block diagram of an optical circuit including an optical amplifier.

DETAILED DESCRIPTION OF THE PREFERRED EMBODIMENTS

Prior to describing embodiments of the present invention, the principle of the present invention will be described with reference to FIG. 2A and FIG. 2B, to facilitate the understanding of the present invention.

Figure 1:
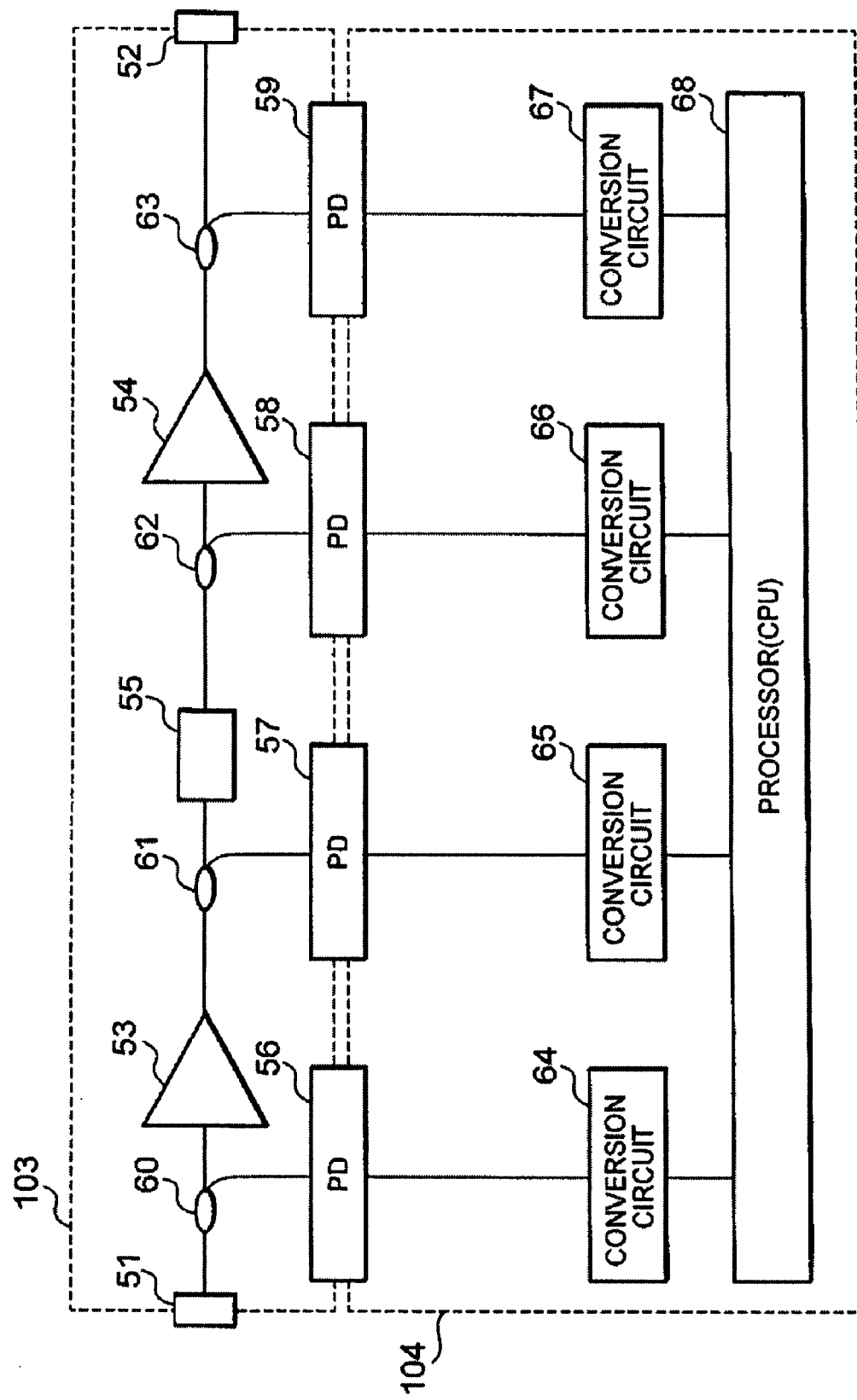
FIG. 1 is a diagram showing an example of a circuit structure of a conventional optical circuit.
Figure 2A:
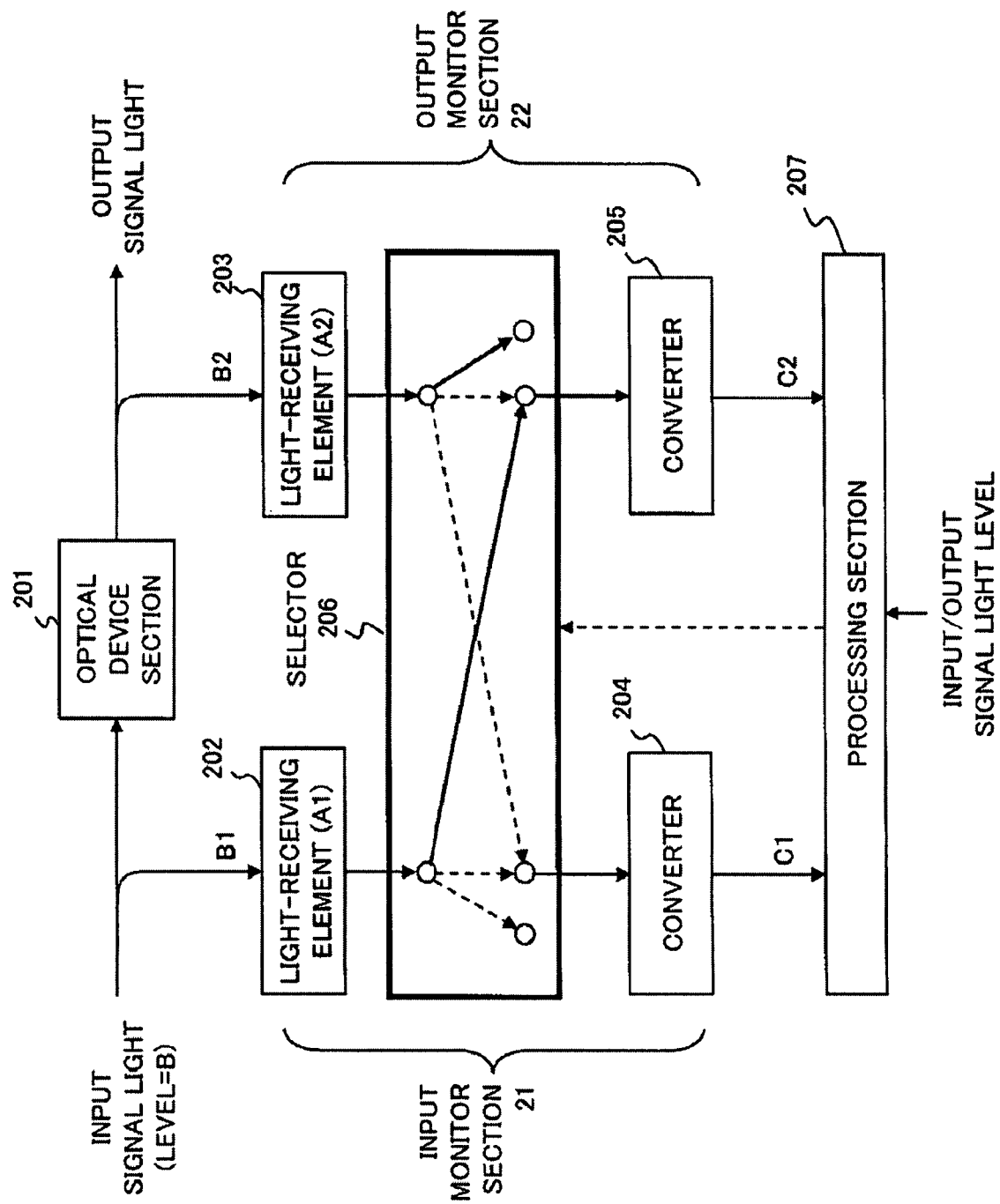
FIG. 2A is a schematic functional block diagram of an optical circuit to describe the principle of the present invention.

An optical circuit as shown in FIG. 2A is provided with an optical device section 201 which includes at least one optical device which performs optical processing on signal light. At the input side of the optical circuit, there is provided an input monitor section 21 including a light-receiving element (photo detector) 202 which converts input signal light (light power level=B=B1) into current (photocurrent) with conversion efficiency A1; and a converter 204 which converts the output current of the light-receiving element to an electrical signal in a predetermined form as a monitored value C1 of signal light. At the output side of the optical circuit, there is provided an output monitor section 22 including a light-receiving element (photo detector) 203 which converts output signal light (light power level=B2) into current (photocurrent) with conversion efficiency A2; and a converter 205 which converts the output current of the light-receiving element to an electrical signal in a predetermined form as a monitored value C2 of signal light.

According to the present invention, the optical circuit is further provided with a selector 206 that controls delivery of the output current of each of the light-receiving elements 202 and 203, which is schematically shown by arrows in the selector 206. As described later, the selector 206 can interrupt a supply of the output current of the light-receiving element 202 to the converter 204 while supplying the output current of the light-receiving element 202 to the converter 205. Inversely, the selector 206 can interrupt a supply of the output current of the light-receiving element 203 to the converter 205 while supplying the output current of the light-receiving element 203 to the converter 204.

A processing section 207 calculates the correlation between the level B2 of the output signal light and its monitored value C2 output from the converter 205 in such a state that the selector 206 supplies the output current of the light-receiving element 202 to the converter 205 as shown by solid arrows in FIG. 2A. More specifically, the processing section 207 calculates the value of the output current of the light-receiving element 202 by using the level B (=B1) of the input signal light and the conversion efficiency A1 of the light-receiving element 202. The level B of the input signal light may be measured by a measurement means for measuring the level of input signal light. The processing section 207 uses the calculated value of the output current and the conversion efficiency A2 of the light-receiving element 203 to calculate the level B2 of the output signal light that should be incoming into the light-receiving element 203 when the light-receiving element 203 outputs the current of this calculated output current value, and determines the correlation between the level B2 of the output signal light and its monitored value C2.

In other words, the selector 206 forwards the output current of the light-receiving element 202 to the converter 205 provided for the light-receiving element 203, and the level B2 of the output signal light, which should be detected by the light-receiving element 203, is imaginarily calculated based upon the level B of the input signal light and the conversion efficiencies A1 and A2 of the light-receiving elements 202 and 203. Thus, the correlation between the level B2 of the output signal light and its monitored value C2 output from the converter 205 can be obtained.

Accordingly, even if the level B2 of the output signal light cannot be directly measured, it is possible to calculate the correlation between the level B2 of the output signal light and its monitored value C2.

In the optical circuit shown in FIG. 2A, the level B of the input signal light to the optical device section 201 is measured by an external measurement means (not shown) and the measured level B of the input signal light is provided to the processing section 207. However, instead of the level B of the input signal light to the optical device section 201, the level (B2) of the output signal light of the optical device section 201 can be measured by the measurement means. In this case, the selector 206 interrupts a supply of the output current of the light-receiving element 202 to the converter 204 while supplying the output current of the light-receiving element 203 to the converter 204. The processing section 207 calculates the value of the output current of the light-receiving element 203 by using the level B2 of the output signal light and the conversion efficiency A2 of the light-receiving element 203. Based on this calculated output current value and the conversion efficiency A1 of the light-receiving element 202, the processing section 207 calculates the level of the input signal light that should be incoming into the light-receiving element 202 when the light-receiving element 202 outputs the current of the calculated output current value. Thus, the correlation between the level B1 of the input signal light and its monitored value C1 output from the converter 204 is obtained.

In other words, the selector 206 outputs the output current of the light-receiving element 203 to the converter 204 provided for the light-receiving element 202, and the level B1 of the input signal light, which should be detected by the light-receiving element 202, is imaginarily calculated based upon the level of the output signal light and the conversion efficiencies A1 and A2 of the light-receiving elements 202 and 203. Thus, the correlation between the level B1 of the input signal light and its monitored value C1 output from the converter 204 can be obtained.

Accordingly, even if the level B1 of the input signal light cannot be directly measured, it is possible to calculate the correlation between the level B1 of the output signal light and its monitored value C1.

As shown in FIG. 2B, the optical device section 201 may be an optical amplification section including at least one optical amplifier for amplifying signal light.

Hereinafter, taking an optical amplification section as the optical device section 201, exemplary embodiments of the present invention will be described with reference to the accompanying drawings.

1. First Exemplary Embodiment

1.1) Circuit

Figure 3:
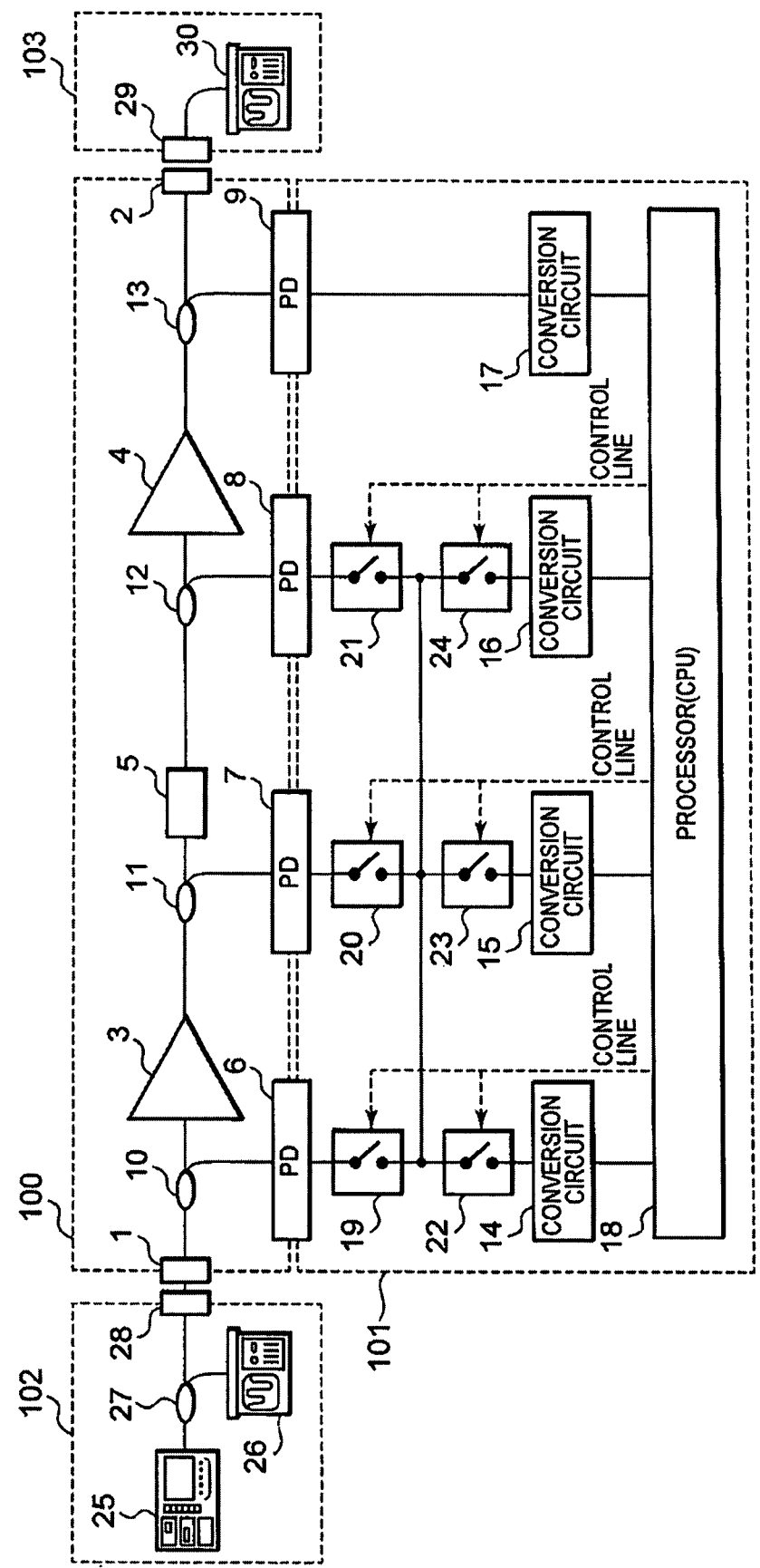
FIG. 3 is a diagram showing the circuit structure of an optical circuit according to a first exemplary embodiment of the present invention.

FIG. 3 is a diagram showing the circuit structure of an optical circuit according to a first exemplary embodiment of the present invention. The circuit as shown in FIG. 3 can be broadly divided into three sections: an optical module section 100 that amplifies an optical signal; an electronic control section 101 that controls the optical module section 100; a signal light power measurement section 102 that includes a light source 25 for generating input signal light to be input to the optical module section 100 and a power meter 26 used to detect the power of the input signal light of the optical module section 100; and a signal light power measurement section 103 that includes a power meter 27 used to detect the power of the output signal light of the optical module section 100.

The optical module section 100 includes: an optical connector 1 for input of signal light into the optical module section 100; an optical connector 2 for output of the signal light from the optical module section 100; erbium-doped fibers (EDFs) 3 and 4, each of which is an optical amplifier composed of a medium for directly optically amplifying the signal light; a gain equalizer 5 for equalizing the signal light power of each channel included in the WDM signal light to be output from the optical module section 100; photodiodes (PDs) 6 to 9 for detecting the power of the signal light before and after the EDF 3 and before and after the EDF 4, respectively; and optical couplers 10 to 13 for branching the signal light towards the PDs 6 to 9, respectively.

The electronic control section 101 includes: conversion circuits 14 to 17 for converting the currents output by the PDs 6 to 9 into numerical data, respectively; a processor 18 that receives the PD monitored value (numerical data) from any one of the conversion sections 14 to 17 and calculates the power of signal light; and electric switches 19-24 which function as a selector as described later. A pair of the electric switches 19 and 22 connects the PD 6 and the conversion circuit 14 in a normal state; a pair of the electric switches 20 and 23 connects the PD 7 and the conversion circuit 15 in a normal state; and a pair of the electric switches 21 and 24 connects the PD 8 and the conversion circuit 16 in a normal state. Note that the processor 18 has a function of controlling the gain for signal light by adjusting the pumping light of a pumping LD (not shown) based on the PD monitored values. However, since this gain control function is well known to those skilled in the art and does not directly relate to the present invention, a detailed description thereof will be omitted.

The signal light power measurement section 102 includes: a light source 25 for generating signal light; an optical power meter 26 for measuring the power of the signal light to be input to the optical module section 100; an optical coupler 27 for branching the signal light into the optical power meter 26 to measure the power of the signal light to be input to the optical module section 100; and an optical connector 28 connected to the optical connector 1, for input of the signal light into the optical module section 100.

The signal light power measurement section 103 includes: an optical connector 29 connected to the optical connector 2 for input of the signal light from the optical module section 100; and an optical power meter 30 for measuring the power of the signal light input from the optical module section 100.

In addition, control lines are provided, connecting between the processor 18 and the electric switches 19 to 24, for the processor 18 to control the electric switches 19 to 24.

Although the configuration of the optical circuit according to the first exemplary embodiment of the present invention has been described, a detailed description of a scheme for directly optically amplifying signal light, performed by the optical module section 100, will be omitted because it is well known to those skilled in the art and does not directly relate to the present invention.

Moreover, the configuration of the optical module section 100 shown in FIG. 3 is a typical example of that of a direct optical circuit. However, any configuration can be employed as long as an optical module includes a PD with respect to which the power of signal light cannot be directly measured by using a meter or the like.

Each of the conversion circuits 14 to 17 includes, in general, a current-to-voltage conversion circuit (I/V conversion circuit) that converts an output current from a PD into voltage, and an analog-to-digital conversion circuit (A/D conversion circuit) that coverts the output of the IV conversion circuit into a digital signal. However, the conversion circuits 14 to 17 may have any configuration as long as the processor 18 can recognize their outputs as numerical data. For the processor 18, a CPU (Central Processing Unit) or a program-controlled processor on which control programs run is generally used but the architecture thereof is not material.

It is also possible to use an optical device such as a variable optical attenuator (VOA) or a variable attenuation slope compensator (VASC) in place of the gain equalizer 5. Moreover, the gain equalizer 5 can even be omitted if the gain of the signal light to be output from the optical module section 100 is not equalized. In this case, a set of the PD 7 and conversion circuit 15, or a set of the PD 8 and conversion circuit 16, can be omitted.

Output terminals of the electric switches 19 to 21 and input terminals of the electric switches 22 to 24 are short-circuited. Moreover, as mentioned earlier, the control lines provided for control of the electric switches 19 to 24 connect to the processor 18. The electric switches 19 to 24 and processor 18 correspond to a control section, and the processor 18 corresponds to a processing section. Additionally, it is preferable that the value of resistance at the input and output terminals of each electric switch be as small as possible to prevent a reduction in the photocurrent output from each PD.

1.2) Operation

Next, the operation of the optical circuit according to the first exemplary embodiment of the present invention will be described with reference to FIG. 3. It is assumed that the conversion efficiency [μA/mW] of each of the PDs 6 to 9 is calculated in advance when the optical module section 100 is manufactured, based on the power of signal light [mW] and the amount of current [μA] produced by each of the PDs 6 to 9.

First, the processor 18 allows the electric switches 19 and 22 to conduct while turning off the electric switches 20, 21, 23, and 24. In this state, the optical connectors 1 and 28 are connected, and signal light is input from the light source 25. Here, it is assumed that C11 [bit] is a PD monitored value output from the conversion circuit 14 to the processor 18 when the power of the signal light measured by using the optical power meter 26 is B11 [mW], and that C12 [bit] is a PD monitored value output from the conversion circuit 14 to the processor 18 when the power of the signal light measured by using the optical power meter 26 is B12 [mW]. In this case, a linear approximation equation showing the correlation of the power of the signal light, Y1 [mW], to an arbitrary PD monitored value, X1 [bit], is represented by the following equation:

$$Y1[mW]=K1 \times X1[bit]+M1$$

where $$K1[mW/bit] = \frac{B11-B12}{C11-C12},$$
$$M1[mW] = B12 - K1 \times C12 \text{ (or } B11 - K1 \times C11)$$

Incidentally, it is possible to obtain a higher-order approximation equation by increasing the number of signal light powers measured by using the optical power meter 26 and the number of PD monitored values. However, this does not directly relate to the present invention, and therefore a description thereof will be omitted.

Next, to obtain the correlation between the power of signal light and its PD monitored value for the PD 7, the processor 18 allows the electric switches 19 and 23 to conduct and turns off the electric switches 20 to 22 and 24.

Assuming that the conversion efficiency of the PD 6 is A1 [μA/mW], then when the power of the signal light measured by using the optical power meter 26 is B1 [mW], the amount of output current of the PD 6 input to the conversion circuit 15 is (A1×B11) [μA].

Here, it is supposed that this amount of output current is generated at the PD 7 by signal light coming into the PD 7. Assuming that the conversion efficiency of the PD 7 is A2 [μA/mW], the power of the signal light coming into the PD 7, B21 [mW], is calculated by the following equation, which means that it is possible to calculate the power of the signal light imaginarily incoming into the PD 7.

$$B21[mW] = \frac{A1}{A2} \times B11$$

Here, similarly to the above-described Y1-X1 correlation, assuming that C21 [bit] is a PD monitored value which the processor 18 receives from the conversion circuit 15 when the power of the signal light incoming into the PD7 is B21 [mW], and C22 [bit] is a PD monitored value which the processor 18 receives from the conversion circuit 15 when the power of the signal light incoming into the PD 7 is B22 [mW], then a linear approximation equation showing the correlation of the power of the signal light, Y2 [mW], to an arbitrary PD monitored value, X2 [bit], is represented by the following equation.

$$Y2[mW]=K2 \times X2[bit]+M2$$

where $$K2[mW/bit] = \frac{B21-B22}{C21-C22},$$
$$M2[mW] = B22 - K2 \times C22 \text{ (or } B21 - K2 \times C21),$$

where $$B21 = \frac{A1}{A2} \times B11, \quad B22 = \frac{A1}{A2} \times B12.$$

Incidentally, it is possible to calculate a higher-order approximation equation if increasing the number of signal light powers measured by using the optical power meter 26 and the number of PD monitored values. However, this does not directly relate to the present invention, and therefore a description thereof will be omitted.

With respect to the PD 8, the processor 18 can also calculate the correlation between the power of the incoming signal light and its PD monitored value by applying the above method for calculating the correlation between the power of the incoming signal light and its PD monitored value with respect to the PD 7. In this case, the processor 18 allows the electric switches 19 and 24 to conduct and turns off the electric switches 20 to 23.

The processor 18 stores the calculated correlation expressions in a memory (not shown) and uses it in a normal state (a state where the control for calculating a correlation expression is not performed) to calculate the power of signal light detected by each PD, from a PD monitored value output from each corresponding conversion circuit.

In a normal state where the power of signal light detected by each PD is calculated based on the obtained correlation expressions, the processor 18 allows only the electric switches 19 and 22 to conduct and turns off the other switches when calculating the power of signal light detected by the PD 6, allows only the electric switches 20 and 23 to conduct and turns off the other switches when calculating the power of signal light detected by the PD 7, and allows only the electric switches 21 and 24 to conduct and turns off the other switches when calculating the power of signal light detected by the PD 8.

When the resistance between the terminals of an electric switch is large, the amount of output current of a PD is reduced. However, this reduced amount of PD output current can be calculated from the value of the resistance between the terminals of a pair of electric switches in question and the value of voltage at the output end of the PD in question. Thus, an error in a PD monitored value can be corrected.

As described above, according to the first exemplary embodiment of the present invention, the correlation between the power of signal light and its PD monitored value is calculated in such a manner that the power of signal light coming into a PD with respect to which the power of the signal light cannot be directly measured is imaginarily calculated based upon the power of signal light coming into a PD with respect to which the power of the signal light can be directly measured and upon the conversion efficiency of each PD. Accordingly, it is possible to calculate the correlation between the power of signal light and its PD monitored value, without cutting optical fiber connected to a PD with respect to which the power of the signal light cannot be directly measured to perform measurement.

Moreover, a change of conversion circuit to which PD output current is input can be made by the electric switches. Accordingly, it is possible to obtain the correlation between the power of signal light and its PD monitored value with respect to an arbitrary number of the PDs.

In the optical circuit according to the first exemplary embodiment of the present invention, the power of the input signal light to the optical module section 100 is measured by using the optical power meter 26, and the processor 18 uses the measured power of the input signal light to calculate the correlation between the power of signal light and its PD monitored value with respect to each of the PDs 7 and 8. However, the optical circuit may also be configured so that the power of the output signal light from the optical module section 100 is measured by using the optical power meter 30, and the processor 18 uses the measured power of the output signal light to calculate the correlation between the power of signal light and its PD monitored value with respect to each of the PDs 7 and 8.

In this case, electric switches are provided between the PD 9 and the conversion circuit 17 similarly to the other electric switches between the other PDs and conversion circuits. When calculating the correlation between the power of signal light and its PD monitored value with respect to the PD 7, the processor 18 performs switch control so that a supply of output currents from the PDs 6 to 8 to the conversion circuit 15 is interrupted while an output current from the PD 9 only is supplied to the conversion circuit 15. When calculating the correlation between the power of signal light and its PD monitored value with respect to the PD 8, the processor 18 performs switch control so that a supply of output currents from the PD 6 to 8 to the conversion circuit 16 is interrupted while an output current from the PD 9 only is supplied to the conversion circuit 16.

2. Second Exemplary Embodiment

Figure 4:
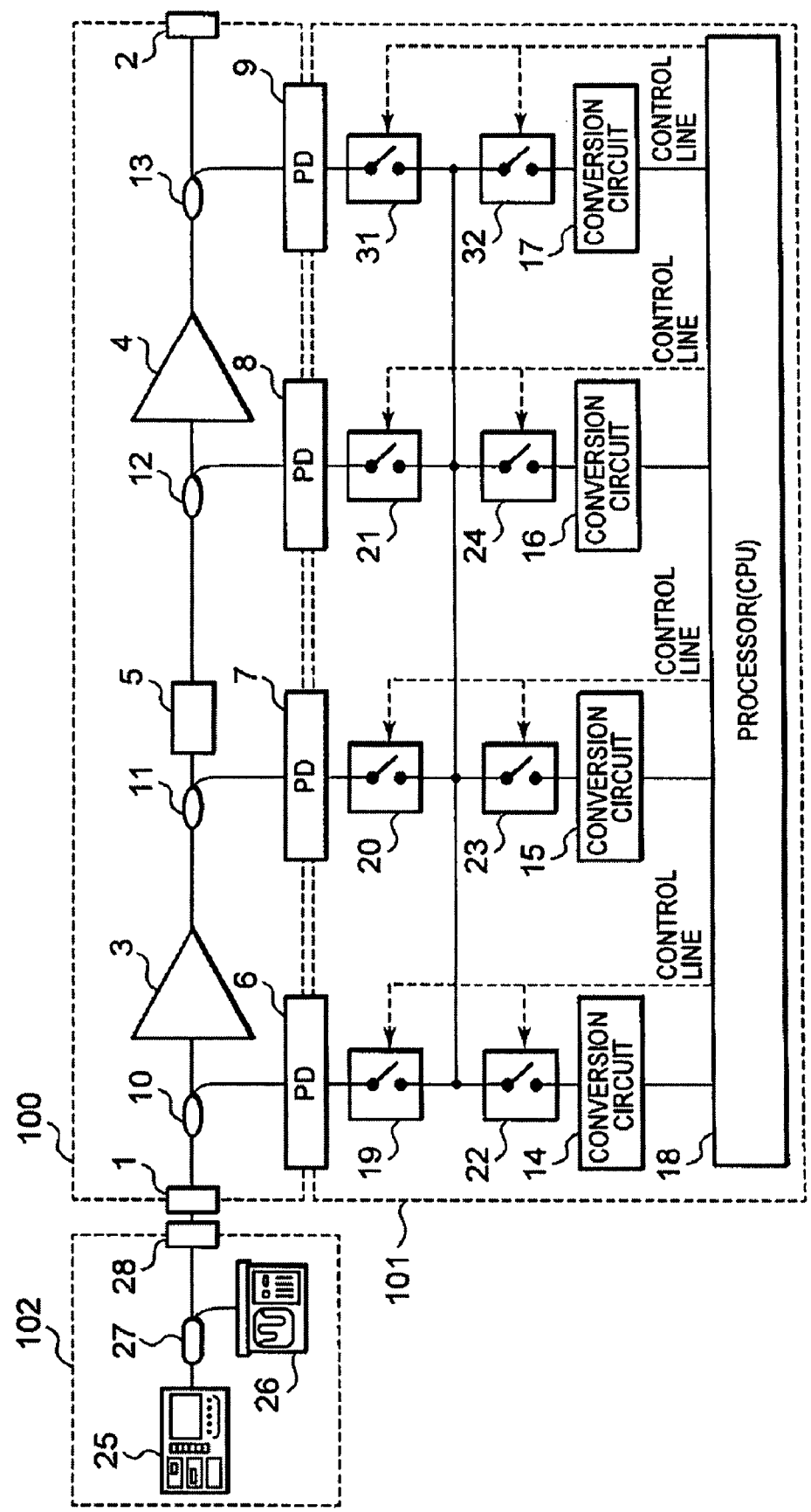
FIG. 4 is a diagram showing the circuit structure of an optical circuit according to a second exemplary embodiment of the present invention.

Next, an optical circuit according to a second exemplary embodiment of the present invention will be described with reference to FIG. 4. FIG. 4 is a diagram showing the configuration of the optical circuit according to the second exemplary embodiment of the present invention. In FIGS. 3 and 4, equivalent sections and portions are denoted by the same reference numerals.

Referring to FIG. 4, the output end of the PD 9 is additionally connected to electric switches 31 and 32, which make the optical power meter 30 at the optical connector 2 unnecessary. Applying the scheme for calculating the correlation between the power of signal light and its PD monitored value with respect to the PDs 7 and 8 described in the first exemplary embodiment, the processor 18 can also calculate the correlation between the power of signal light and its PD monitored value with respect to the PD 9. In this case, the processor 18 allows the electric switches 19 and 32 to conduct while turning off the electric switches 20 to 24 and 31.

Incidentally, when calculating the correlation between the power of signal light and its PD monitored value with respect to the PD 7, the processor 18 allows the electric switches 19 and 23 to conduct and turns off the electric switches 20 to 22, 24, 31, and 32. When calculating the correlation between the power of signal light and its PD monitored value with respect to the PD 8, the processor 18 allows the electric switches 19 and 24 to conduct and turns off the electric switches 20 to 23, 31, and 32.

As described above, according to the second exemplary embodiment of the present invention, it is possible to calculate the correlation between the power of signal light and its PD monitored value for the PD 9, without measuring the power of the output signal light from the optical module section 100 by using the optical power meter 30.

3. Third Exemplary Embodiment

Figure 5:
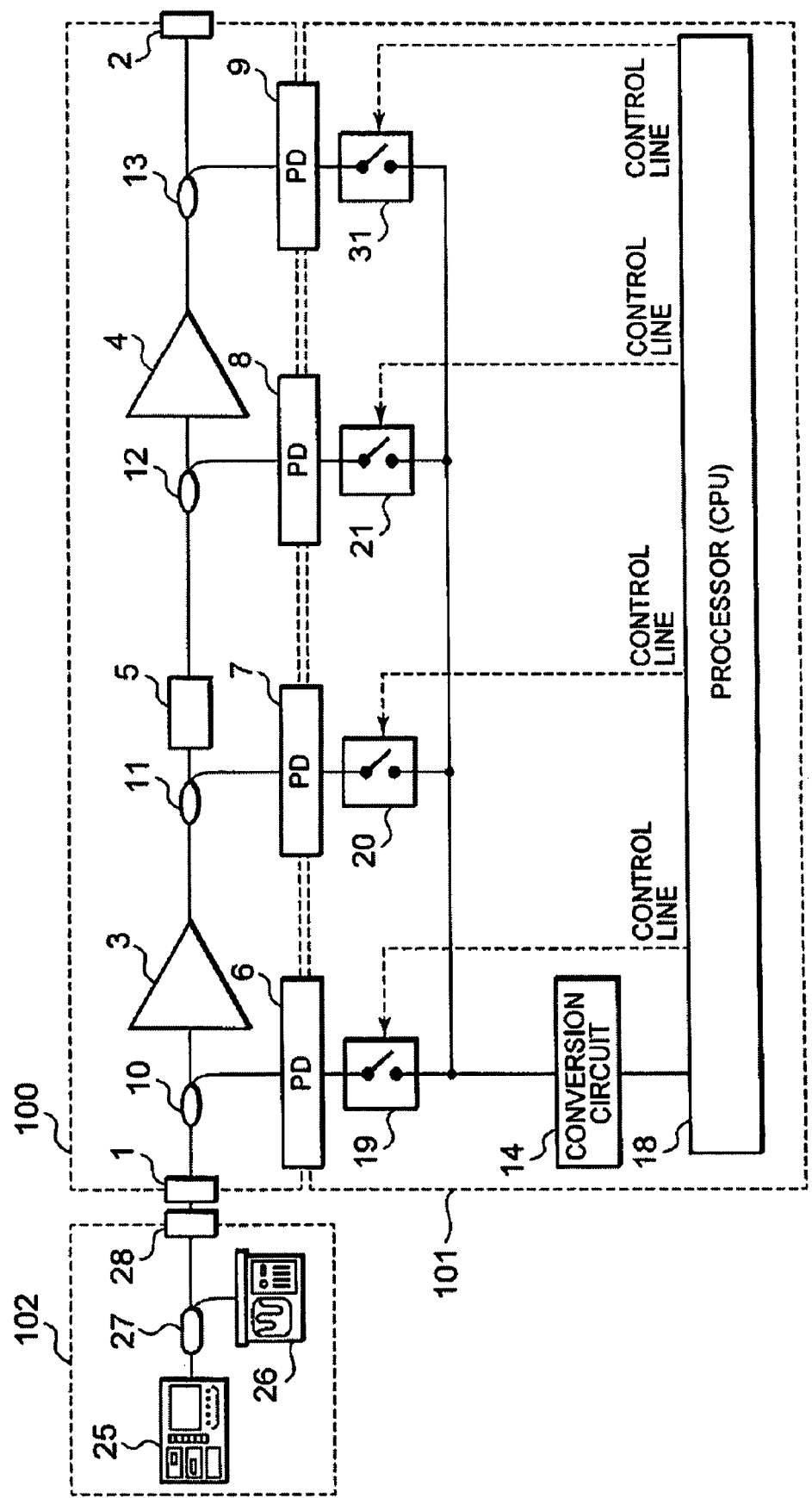
FIG. 5 is a diagram showing the circuit structure of an optical circuit according to a third exemplary embodiment of the present invention.

Next, an optical circuit according to a third exemplary embodiment of the present invention will be described with reference to FIG. 5. FIG. 5 is a diagram showing the configuration of the optical circuit according to the third exemplary embodiment of the present invention. In FIGS. 3 to 5, equivalent sections and portions are denoted by the same reference numerals.

Referring to FIG. 5, to reduce the number of electric switches and conversion circuits in the electronic control section 101, each of the output terminals of the electric switches 19 to 21 and 31 and the input terminal of the conversion circuit 14 are short-circuited. The electric switches 22 to 24 and 32 and the conversion circuits 15 to 17 are eliminated.

According to the third exemplary embodiment, the processor 18 allows the electric switch 19 to conduct while turning off the electric switches 20, 21, and 31, thus obtaining the correlation between the power of signal light and its PD monitored value with respect to the PD 6. When obtaining the correlation between the power of signal light and its PD monitored value with respect to each of the PDs 7 to 9, the processor 18 also allows the electric switch 19 to conduct and turns off the electric switches 20, 21, and 31. In this state, the processor 18 imaginarily calculates the power of signal light for each of the PDs 7 to 9 from the conversion efficiency of each PD and the power of the input signal light measured by using the optical power meter 26. Thus, it is possible to obtain the correlation between the power of signal light and its PD monitored value.

Incidentally, in a normal state where the power of signal light detected by each PD is calculated based on a corresponding one of the obtained correlation expressions, the processor 18 allows only the electric switch 19 to conduct and turns off the other switches when calculating the power of signal light detected by the PD 6, allows only the electric switch 20 to conduct and turns off the other switches when calculating the power of signal light detected by the PD 7, allows only the electric switch 21 to conduct and turns off the other switches when calculating the power of signal light detected by the PD 8, and allows only the electric switch 31 to conduct and turns off the other switches when calculating the power of signal light detected by the PD 9.

As described above, according to the third exemplary embodiment, the number of uses of the electric switches and conversion circuits is reduced, whereby electrical errors involved with the electric switches and conversion circuits can be reduced.

In the optical circuit according to the third exemplary embodiment of the present invention, the power of the input signal light to the optical module section 100 is measured by using the optical power meter 26, and the processor 18 can use the measured power of the input signal light to obtain the correlation between the power of signal light and its PD monitored value with respect to each PD. However, the optical circuit can also be configured so that, with the optical power meter 30 connected to the optical module section 100 through the connector 2 (see FIG. 3), the power of the output signal light from the optical module section 100 is measured by using this optical power meter 30, and the processor 18 can use the measured power of the output signal light to obtain the correlation between the power of signal light and its PD monitored value with respect to each PD.

In this case, the processor 18 allows the electric switch 31 to conduct while turning off the electric switches 19 to 21, thus calculating the correlation between the power of signal light and its PD monitored value for each PD.

4. Fourth Exemplary Embodiment

Figure 6:
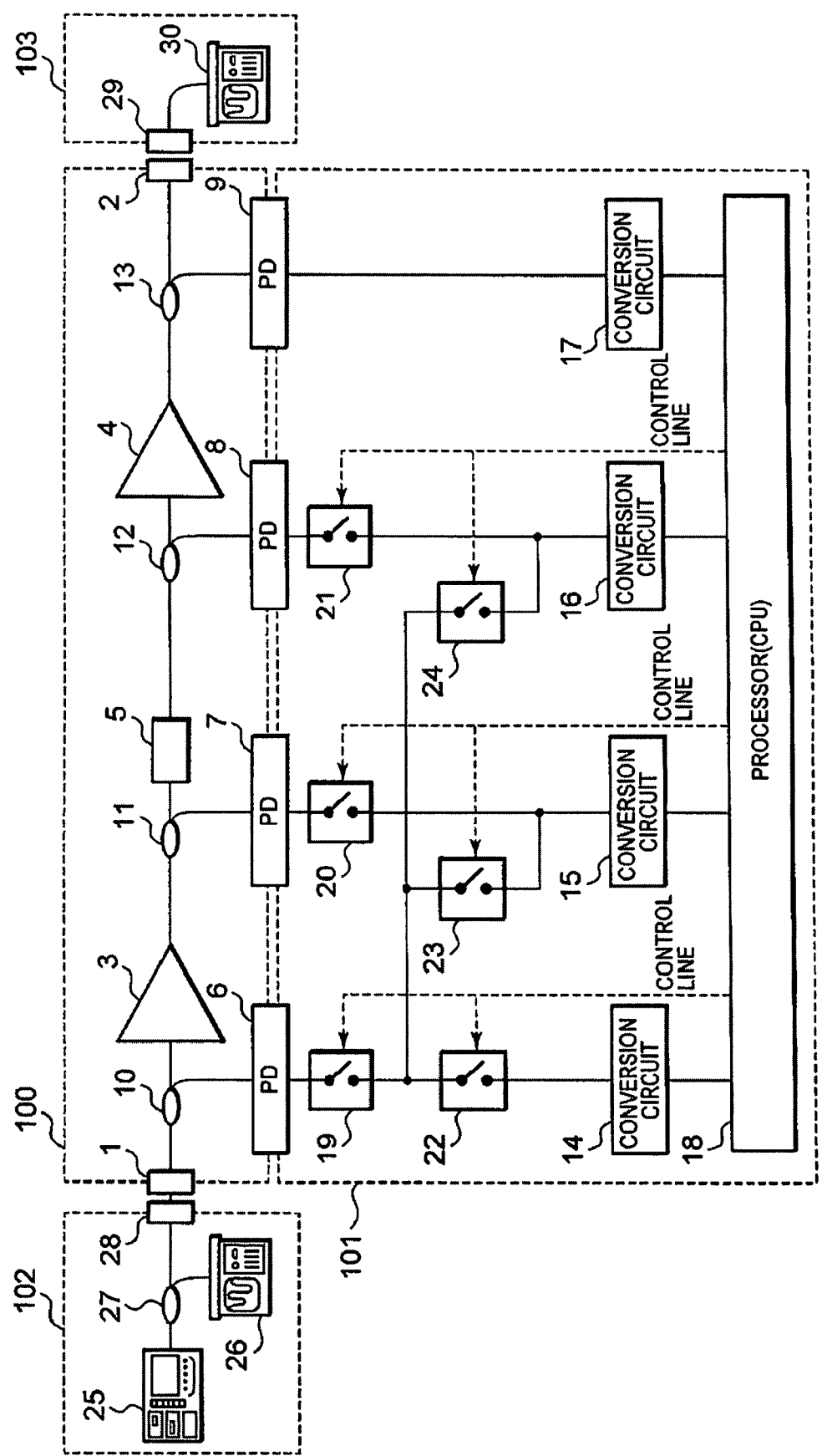
FIG. 6 is a diagram showing the circuit structure of an optical circuit according to a fourth exemplary embodiment of the present invention.

Next, an optical circuit according to a fourth exemplary embodiment of the present invention will be described with reference to FIG. 6. FIG. 6 is a diagram showing the configuration of the optical circuit according to the fourth exemplary embodiment of the present invention. In FIGS. 3 and 6, equivalent sections and portions are denoted by the same reference numerals.

Referring to FIG. 6, the basic configuration of the optical circuit according to the fourth exemplary embodiment of the present invention is the same as the configuration shown in FIG. 3 except the way of connecting the electric switches, on which some modification is made in the fourth exemplary embodiment. When obtaining the correlation between the power of signal light and its PD monitored value with respect to the PD 6, the processor 18 allows the electric switches 19 and 22 to conduct while turning off the electric switches 23 and 24. Similarly, with respect to the PD 7, the processor 18 allows the electric switches 19 and 23 to conduct while turning off the electric switches 20, 22, and 24 and, with respect to the PD 8, allows the electric switches 19 and 24 to conduct while turning off the electric switches 21 to 23.

In a normal state where the power of signal light detected by each PD is calculated based on a corresponding one of the obtained correlation expressions, the processor 18 turns off the electric switches 23 and 24 while allowing the other switches to conduct, whereby the processor 18 can calculate the power of signal light detected by each PD.

According to the first exemplary embodiment of the present invention shown in FIG. 3, the output terminals of the electric switches 19 to 21 are short-circuited. Accordingly, in a normal state, each time the power of signal light detected by each PD is calculated, it is necessary to switch between the electric switches 19 to 21 for selecting a PD output and to switch between the electric switches 22 to 24 for selecting a conversion circuit that takes in the PD output. On the other hand, according to the fourth exemplary embodiment of the present invention shown in FIG. 6, it is possible to prevent the output current of the PD 6 from flowing into the conversion circuits 15 and 16, by turning off the electric switches 23 and 24 in a normal state. Accordingly, the need to switch between the electric switches every time a calculation is performed can be eliminated.

5. Fifth Exemplary Embodiment

Figure 7:
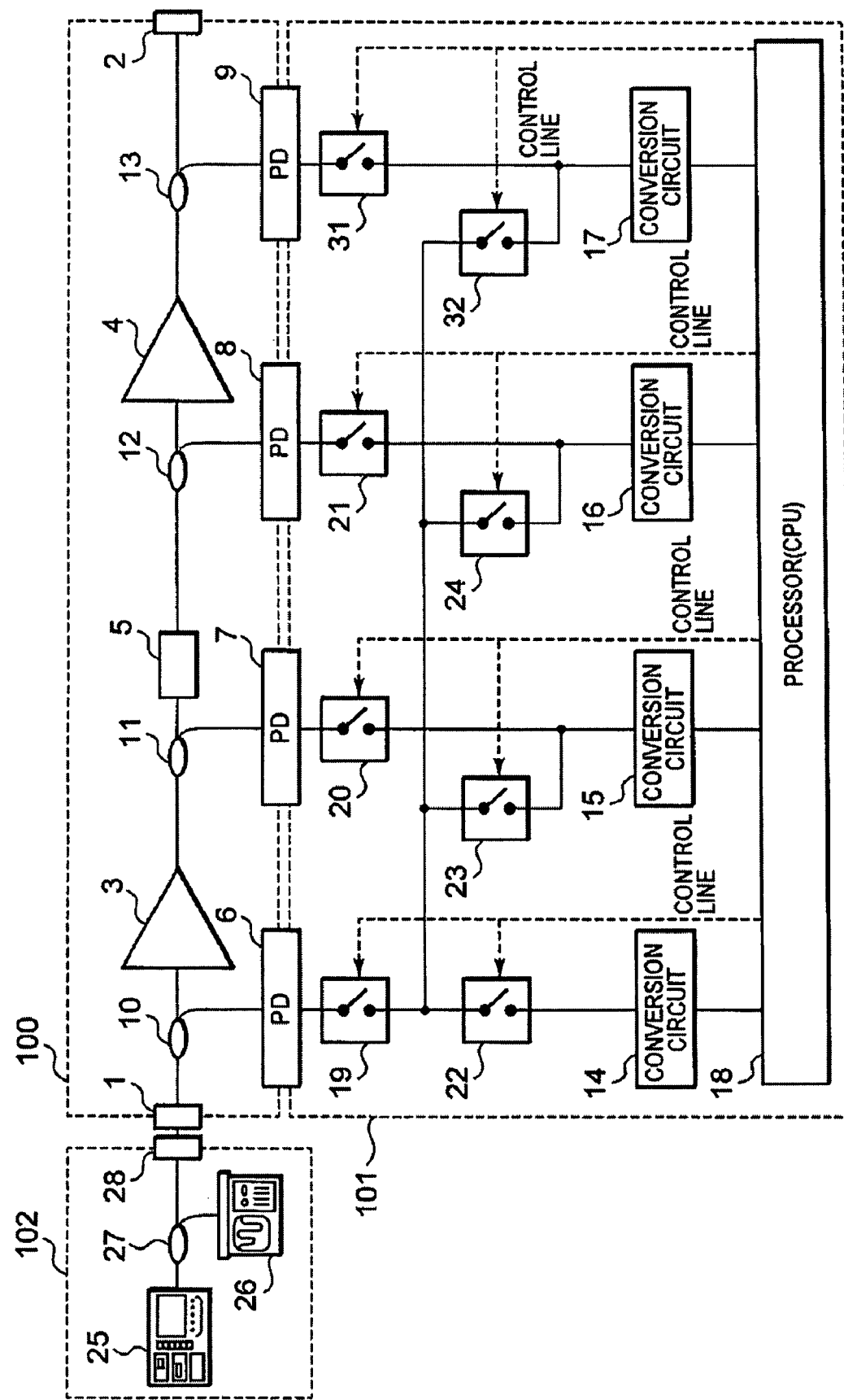
FIG. 7 is a diagram showing the circuit structure of an optical circuit according to a fifth exemplary embodiment of the present invention.

Next, an optical circuit according to a fifth exemplary embodiment of the present invention will be described with reference to FIG. 7. FIG. 7 is a diagram showing the configuration of the optical circuit according to the fifth exemplary embodiment of the present invention. In FIGS. 4 and 7, equivalent sections and portions are denoted by the same reference numerals.

Referring to FIG. 7, the basic configuration of the optical circuit according to the fifth exemplary embodiment of the present invention is the same as the configuration shown in FIG. 4 except the way of connecting the electric switches, on which some modification is made in the fifth exemplary embodiment. The principle of the operation of the optical circuit according to the fifth exemplary embodiment of the present invention is similar to that of the fourth exemplary embodiment described above. According to the fifth exemplary embodiment as well, it is possible to prevent an output current of the PD 6 from flowing into the conversion circuits 15 to 17, by turning off the switches 23, 24, and 32 in a normal state. Accordingly, the need to switch between the electric switches every time a calculation is performed can be eliminated.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical circuit comprising at least one optical device which inputs one of a first signal light and a second signal light and outputs the other, further comprising;
 a first photodetector for converting the first signal light to a first detection signal, wherein the first photodetector has a first conversion efficiency;
 a second photodetector for converting the second signal light to a second detection signal, wherein the second photodetector has a second conversion efficiency;
 a converter provided for each of the first and second photodetectors, for converting a corresponding detection signal to a monitored signal; and
 a controller controlling such that the first detection signal is connected to a non-corresponding converter and the second detection signal is connected to the interruption, calculating a first signal value of the first detection signal from the first conversion efficiency and a previously measured level of the first signal light; calculating an imaginary light level of the output signal light from the first signal value calculated and the second conversion efficiency, wherein the imaginary light level of the second signal light is a light level of the second signal light to be input to the second photodetector when the second detection signal exhibits the first signal value calculated; and calculating correlation between the imaginary light level of the second signal light and a monitored signal obtained by the non-corresponding converter inputting the first signal value calculated.

2. An optical circuit comprising at least one optical device which inputs one of a first signal light and a second signal light and outputs the other, further comprising:
- a first monitor section including a first photodetector for converting the first signal light to a first detection signal and a first converter for converting the first detection signal to a first monitored signal, wherein the first photodetector has a first conversion efficiency;
- a second monitor section including a second photodetector for converting the second signal light to a second detection signal and a second converter for converting the second detection signal to a second monitored signal, wherein the second photodetector has a second conversion efficiency;
- a selector for selectively connecting the first detection signal to one of the second converter and an interruption and selectively connecting the second detection signal to one of the first converter and an interruption; and
- a processor controlling the selector such that the first detection signal is connected to the second converter and the second detection signal is connected to the interruption, wherein the processor calculates a first signal value of the first detection signal from the first conversion efficiency and a previously measured level of the first signal light; calculates an imaginary light level of the second signal light from the first signal value calculated and the second conversion efficiency, wherein the imaginary light level of the second signal light is a light level of the output signal light to be input to the second photodetector when the second detection signal would exhibit the first signal value calculated; and calculates correlation between the imaginary light level of the second signal light and the second monitored signal obtained by the second converter inputting the first signal value calculated.

3. The optical circuit according to claim 2, wherein a plurality of optical devices are optically connected in series, wherein a series of the optical devices inputs one of the first signal light and the second signal light and outputs the other.

4. The optical circuit according to claim 3, further comprising:
- a third monitor section provided between any two adjacent optical devices, wherein the third monitor section includes: a third photodetector for converting third signal light between the two adjacent optical device sections to a third detection signal; and a third converter for converting the third detection signal to a third monitored signal, wherein the third photodetector has a third conversion efficiency,
- wherein the selector selectively connects the first detection signal to one of the third converter and an interruption and selectively connects the third detection signal to one of the first converter, the second converter and an interruption,
- wherein the processor controls the selector such that the first detection signal is connected to the third converter and the third detection signal is connected to the interruption, wherein the processor calculates an imaginary light level of the third signal light from the first signal value calculated and the third conversion efficiency, wherein the imaginary light level of the third signal light is a light level of the third signal light to be input to the third photodetector when the third detection signal exhibits the first signal value calculated; and calculates correlation between the imaginary light level of the third signal light and the third monitored signal obtained by the third converter inputting the first signal value calculated.

5. The optical circuit according to claim 2, wherein respective conversions of the first converter and the second converter are performed by a single converter controlled by the processor.

6. The optical circuit according to claim 4, wherein respective conversions of the first converter, the second converter and the third converter are performed by a single converter controlled by the processor.

7. A method for measuring a monitor characteristic in an optical circuit including at least one optical device which inputs one of a first signal light and a second signal light and outputs the other, wherein the optical circuit further includes: a first photodetector for converting the first signal light to a first detection signal, wherein the first photodetector has a first conversion efficiency; a second photodetector for converting the second signal light to a second detection signal, wherein the second photodetector has a second conversion efficiency; a converter provided for each of the first and second photodetectors, for converting a corresponding detection signal to a monitored signal, comprising:
- connecting the first detection signal to a non-corresponding converter and connecting the second detection signal to an interruption;
- calculating a first signal value of the first detection signal from the first conversion efficiency and a previously measured level of the first signal light;
- calculating an imaginary light level of the output signal light from the first signal value calculated and the second conversion efficiency, wherein the imaginary light level of the second signal light is a light level of the second signal light to be input to the second photodetector when the second detection signal exhibits the first signal value calculated; and
- calculating correlation between the imaginary light level of the second signal light and a monitored signal obtained by the non-corresponding converter inputting the first signal value calculated.

8. A method for measuring a monitor characteristic in an optical circuit including at least one optical device which inputs one of a first signal light and a second signal light and outputs the other, wherein the optical circuit further includes: a first monitor section including a first photodetector for converting the first signal light to a first detection signal and a first converter for converting the first detection signal to a first monitored signal, wherein the first photodetector has a first conversion efficiency; and a second monitor section including a second photodetector for converting the second signal light to a second detection signal and a second converter for converting the second detection signal to a second monitored signal, wherein the second photodetector has a second conversion efficiency,
the method comprising:
- connecting the first detection signal to the second converter and connecting the second detection signal to an interruption;
- calculating a first signal value of the first detection signal from the first conversion efficiency and a previously measured level of the first signal light;
- calculating an imaginary light level of the output signal light from the first signal value calculated and the second conversion efficiency, wherein the imaginary light level of the second signal light is a light level of the second signal light to be input to the second photodetector when the second detection signal exhibits the first signal value calculated; and calculating correlation between the imaginary light level of the second signal light and the second monitored signal obtained by the second converter inputting the first signal value calculated.

9. The method according to claim 8, wherein the optical circuit includes a plurality of optical devices optically connected in series, wherein a series of the optical devices inputs one of the first signal light and the second signal light and outputs the other.

10. The method according to claim 9, wherein the optical circuit further includes a third monitor section provided between any two adjacent optical devices, wherein the third monitor section includes: a third photodetector for converting third signal light between the two adjacent optical device sections to a third detection signal; and a third converter for converting the third detection signal to a third monitored signal, wherein the third photodetector has a third conversion efficiency, the method further comprising:

connecting the first detection signal to the third converter and connecting the third detection signal to an interruption;

calculating an imaginary light level of the third signal light from the first signal value calculated and the third conversion efficiency, wherein the imaginary light level of the third signal light is a light level of the third signal light to be input to the third photodetector when the third detection signal exhibits the first signal value calculated; and calculating correlation between the imaginary light level of the third signal light and the third monitored signal obtained by the third converter inputting the first signal value calculated.

11. The method according to claim 8, wherein respective conversions of the first converter and the second converter are performed by a single converter.

12. The method according to claim 10, wherein respective conversions of the first converter, the second converter and the third converter are performed by a single converter.

13. A measurement device for measuring a monitor characteristic in an optical circuit including at least one optical device which inputs one of a first signal light and a second signal light and outputs the other, wherein the optical circuit further includes: a first photodetector for converting the first signal light to a first detection signal, wherein the first photodetector has a first conversion efficiency; a second photodetector for converting the second signal light to a second detection signal, wherein the second photodetector has a second conversion efficiency; a converter provided for each of the first and second photodetectors, for converting a corresponding detection signal to a monitored signal, comprising:

a selector for connecting the first detection signal to a non-corresponding converter and connecting the second detection signal to an interruption; and a controller controlling the selector such that the first detection signal is connected to a non-corresponding converter and the second detection signal is connected to the interruption; calculating a first signal value of the first detection signal from the first conversion efficiency and a previously measured level of the first signal light; calculating an imaginary light level of the output signal light from the first signal value calculated and the second conversion efficiency, wherein the imaginary light level of the second signal light is a light level of the second signal light to be input to the second photodetector when the second detection signal exhibits the first signal value calculated; and calculating correlation between the imaginary light level of the second signal light and a monitored signal obtained by the non-corresponding converter inputting the first signal value calculated.

14. A measurement device for measuring a monitor characteristic in an optical circuit including at least one optical device which inputs one of a first signal light and a second signal light and outputs the other, wherein the optical circuit further includes: a first monitor section including a first photodetector for converting the first signal light to a first detection signal and a first converter for converting the first detection signal to a first monitored signal, wherein the first photodetector has a first conversion efficiency; and a second monitor section including a second photodetector for converting the second signal light to a second detection signal and a second converter for converting the second detection signal to a second monitored signal, wherein the second photodetector has a second conversion efficiency, the measurement device further comprising:

a selector for selectively connecting the first detection signal to one of the second converter and an interruption and selectively connecting the second detection signal to one of the first converter and an interruption; and a processor controlling the selector such that the first detection signal is connected to the second converter and the second detection signal is connected to the interruption, wherein the processor calculates a first signal value of the first detection signal from the first conversion efficiency and a previously measured level of the first signal light; calculates an imaginary light level of the second signal light from the first signal value calculated and the second conversion efficiency, wherein the imaginary light level of the second signal light is a light level of the output signal light to be input to the second photodetector when the second detection signal exhibits the first signal value calculated; and calculates correlation between the imaginary light level of the second signal light and the second monitored signal obtained by the second converter inputting the first signal value calculated.

15. The measurement device according to claim 14, wherein the optical circuit includes a plurality of optical devices optically connected in series, wherein a series of the optical devices inputs one of the first signal light and the second signal light and outputs the other.

16. The measurement device according to claim 15, wherein the optical circuit further includes a third monitor section provided between any two adjacent optical devices, wherein the third monitor section includes: a third photodetector for converting third signal light between the two adjacent optical device sections to a third detection signal; and a third converter for converting the third detection signal to a third monitored signal, wherein the third photodetector has a third conversion efficiency, wherein the selector selectively connects the first detection signal to one of the third converter and an interruption and selectively connects the third detection signal to one of the first converter, the second converter and an interruption, wherein the processor controls the selector such that the first detection signal is connected to the third converter and the third detection signal is connected to the interruption, wherein the processor calculates an imaginary light level of the third signal light from the first signal value calculated and the third conversion efficiency, wherein the imaginary light level of the third signal light is a light level of the third signal light to be input to the third photodetector when the third detection signal exhibits the first signal value calculated; and calculates correlation between the imaginary light level of the third signal light and the third monitored signal obtained by the third converter inputting the first signal value calculated.

17. The measurement device according to claim 14, wherein respective conversions of the first converter and the second converter are performed by a single converter.

18. The measurement device according to claim 16, wherein respective conversions of the first converter, the second converter and the third converter are performed by a single converter.

19. A computer program instructing a computer to measure a monitor characteristic in an optical circuit including at least one optical device which inputs one of a first signal light and a second signal light and outputs the other, wherein the optical circuit further includes: a first photodetector for converting the first signal light to a first detection signal, wherein the first photodetector has a first conversion efficiency; a second photodetector for converting the second signal light to a second detection signal, wherein the second photodetector has a second conversion efficiency; a converter provided for each of the first and second photodetectors, for converting a corresponding detection signal to a monitored signal, comprising:
- connecting the first detection signal to a non-corresponding converter and connecting the second detection signal to an interruption;
- calculating a first signal value of the first detection signal from the first conversion efficiency and a previously measured level of the first signal light;
- calculating an imaginary light level of the output signal light from the first signal value calculated and the second conversion efficiency, wherein the imaginary light level of the second signal light is a light level of the second signal light to be input to the second photodetector when the second detection signal exhibits the first signal value calculated; and
- calculating correlation between the imaginary light level of the second signal light and a monitored signal obtained by the non-corresponding converter inputting the first signal value calculated.

20. A computer program instructing a computer to measure a monitor characteristic in an optical circuit including at least one optical device which inputs one of a first signal light and a second signal light and outputs the other, wherein the optical circuit further includes: a first monitor section including a first photodetector for converting the first signal light to a first detection signal and a first converter for converting the first detection signal to a first monitored signal, wherein the first photodetector has a first conversion efficiency; and a second monitor section including a second photodetector for converting the second signal light to a second detection signal and a second converter for converting the second detection signal to a second monitored signal, wherein the second photodetector has a second conversion efficiency, comprising:
- connecting the first detection signal to the second converter and connecting the second detection signal to an interruption;
- calculating a first signal value of the first detection signal from the first conversion efficiency and a previously measured level of the first signal light;
- calculating an imaginary light level of the second signal light from the first signal value calculated and the second conversion efficiency, wherein the imaginary light level of the second signal light is a light level of the output signal light to be input to the second photodetector when the second detection signal exhibits the first signal value calculated; and
- calculating correlation between the imaginary light level of the second signal light and the second monitored signal obtained by the second converter inputting the first signal value calculated.

21. The computer program according to claim 20, wherein the optical circuit includes a plurality of optical devices optically connected in series, wherein a series of the optical devices inputs one of the first signal light and the second signal light and outputs the other, wherein the optical circuit further includes a third monitor section provided between any two adjacent optical devices, wherein the third monitor section includes: a third photodetector for converting third signal light between the two adjacent optical device sections to a third detection signal; and a third converter for converting the third detection signal to a third monitored signal, wherein the third photodetector has a third conversion efficiency, the program further comprising:
- connecting the first detection signal to the third converter and connecting the third detection signal to an interruption;
- calculating an imaginary light level of the third signal light from the first signal value calculated and the third conversion efficiency, wherein the imaginary light level of the third signal light is a light level of the third signal light to be input to the third photodetector when the third detection signal exhibits the first signal value calculated; and
- calculating correlation between the imaginary light level of the third signal light and the third monitored signal obtained by the third converter inputting the first signal value calculated.

* * * * *